(No Model.)
J. E. NORELIUS.
BICYCLE SUPPORT.
No. 586,619.  Patented July 20, 1897.
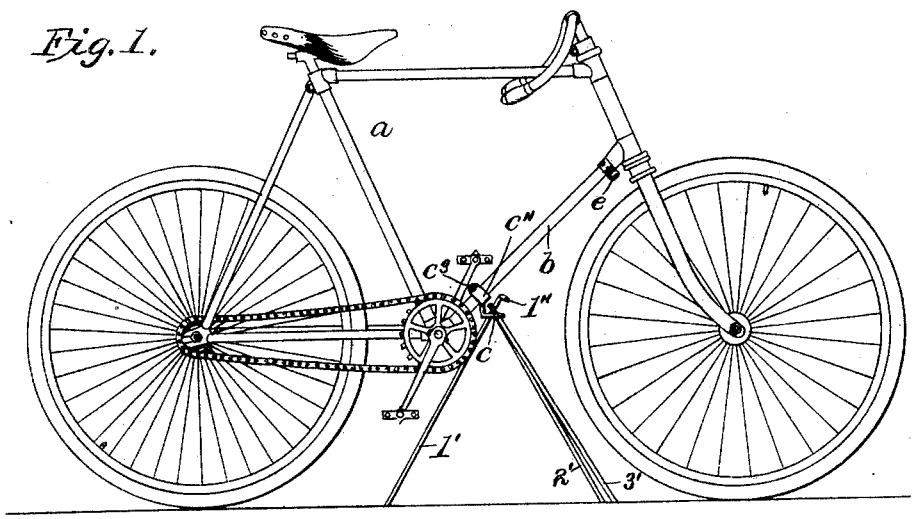
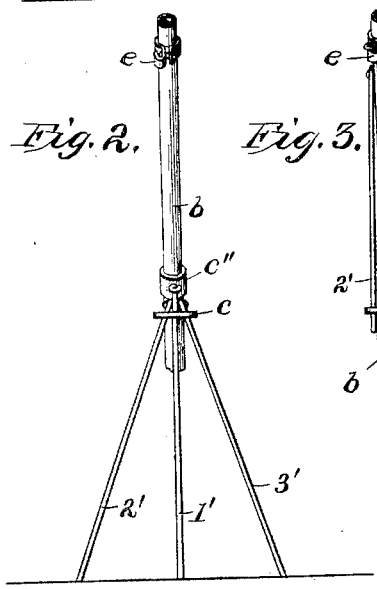
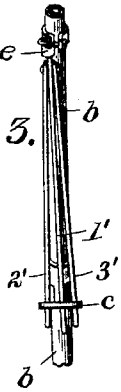
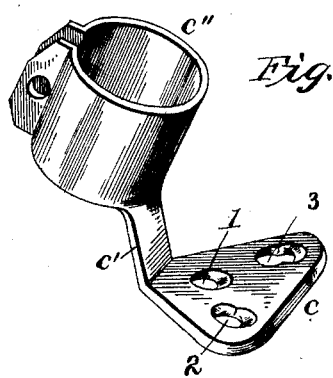
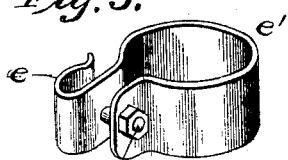
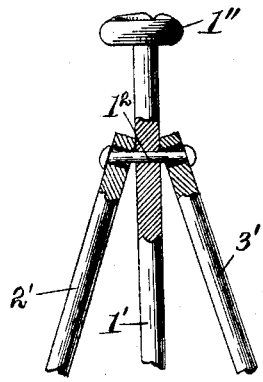
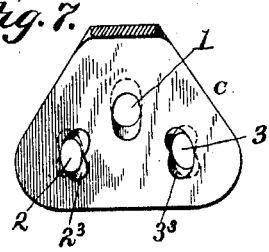
Witnesses:
Howard D. Orr.
Geo. E. Truch.
Inventor:
John E. Norelius,
By Hubert E. Beck
Atty.

UNITED STATES PATENT OFFICE.

JOHN E. NORELIUS, OF EL CAMPO, TEXAS.

BICYCLE-SUPPORT.

SPECIFICATION forming part of Letters Patent No. 586,619, dated July 20, 1897.

Application filed May 13, 1896. Serial No. 591,326. (No model.)

*To all whom it may concern:*

Be it known that I, JOHN E. NORELIUS, a citizen of the United States, residing at El Campo, in the county of Wharton and State of Texas, have invented certain new and useful Improvements in Bicycle-Supports; and I do hereby declare the following to be a full, clear, and exact description of the invention, such as will enable others skilled in the art to which it appertains to make and use the same.

This invention relates to certain improvements in bicycle-supports.

The object of the invention is to provide an improved, simple, and durable bicycle-support which is economical and efficient in construction and composed of a minimum number of parts to attain the ends in view and which can be attached to any bicycle of the ordinary construction by merely clamping certain parts of my device thereto and can be carried on the bicycle without inconvenience to the rider and can be easily adjusted to form a tripod or support for the bicycle to hold the same in an upright or approximately upright position.

The invention consists in certain novel features of construction and in combinations and arrangements of parts, as more fully and particularly described and pointed out hereinafter.

Referring to the accompanying drawings, Figure 1 is a side elevation of a bicycle provided with the improved support, showing the same adjusted to support the bicycle in an upright position. Fig. 2 is a detail elevation of a portion of the lower reach-bar of the frame, showing the support thereon adjusted to operative supporting position. Fig. 3 is a detail elevation of the lower reach-bar of the frame, showing the support folded and in inoperative position, so that the bicycle can be used. Fig. 4 is a detail perspective view of the spreading and supporting head of the support with its clamp. Fig. 5 is a detail perspective view of the catch or support and its clamp for the free ends of the supporting-legs of the clamp when out of use. Fig. 6 is a detail elevation, partially in section, of the upper portions of the supporting-legs, showing the manner of loosely joining them together. Fig. 7 is a plan view of the supporting and spreading head with its clamp and arm broken away.

In the drawings, $a$ is a bicycle of any ordinary construction, having the bottom reach-bar $b$ extending at an angle downwardly from the bicycle-head to the crank-hanger.

The support comprises a plate, body, or head $c$, usually formed flat, with the three (more or less) transverse holes 1, 2, and 3, and the arm or neck $c'$, extending up from one edge and provided at its upper end with the tubular expansible spring-clamp $c''$, having the perforated ears and a clamping-bolt $c^3$ to contract the clamp and lock the same on said lower reach-bar of the bicycle-frame at a suitable point above the crank-hanger and sprocket-wheel.

The clamp is preferably arranged at such an angle to the head $c$ that when said clamp is in position on the reach-bar said head will be held in a horizontal or approximately horizontal position.

The head, neck, and clamp are here shown formed integral of suitable spring metal, but I do not limit my invention to such integral formation, nor to the specific form of clamp here shown, with the depending neck and head beneath the same.

$1'$, $2'$, and $3'$ are the supporting rods or legs, each preferably in the form of a straight metal rod or bar, and $2'$ and $3'$ are of the same or approximately the same length, with the central rod $1'$ extended upwardly and formed with the head or handle $1''$, for the purposes hereinafter mentioned. The upper ends of the two rods $2'$ $3'$ are loosely joined to the upper portion of the central rod $1'$ at a distance below its upper end. For instance, they can be secured, as shown in Fig. 6, by a long rivet $1^3$, passed transversely through the central rod and provided with heads at each end equidistant from the sides of the rod, with the rivet passing through enlarged transverse eyes in the upper ends of the two rods $2'$ $3'$, so that said rods are loosely joined to the central rod, and all the rods can be spread outwardly at any suitable angle to form a tripod, or the rods can be folded together parallel or approximately parallel, substantially as shown in Fig. 3.

The holes or guides for the rods in the head $c$ are preferably arranged triangularly, as shown in Fig. 7, and the rods are confined in these holes to slide therein during their various adjustments. Rod 1' is confined in hole 1, 2' in hole 2, and 3' in hole 3. These holes are inclined at different angles, as clearly shown in Figs. 4 and 7, so that when the rods are pressed down so as to slide downwardly through the holes they will be spread outwardly at their lower ends to form a three-leg support or tripod while the angles of the holes permit this action, and the edges of the holes and the two rods 2' 3', secured to and pressing transversely up against the rod 1', lock the rods in this supporting position. A firm support for the bicycle is thus formed which will hold the wheel from a central point in an upright position, and which is very light and easy to handle and operative and takes up very little room, and which forms a most firm and secure support by reason of its extended tripod shape.

As the rods are longer than the distance from the head $c$ to the ground, the bicycle is lifted a short distance when the rods are being forced down to form the tripod or support. When it is desired to use the bicycle, it is raised a short distance from the ground and the operator grasps the central rod by its head or handle and draws upwardly on the same in a plane about parallel with the said lower reach-bar of the frame. As the rods are drawn up the head closes the rods together, while the additional edge bevel $2^3$ $3^3$ of the holes 2 3 permits the rods 2' 3' to draw up beneath and substantially parallel with the lower reach-bar. The extended end of the central rod is then caught by the spring-clip $e$, while the head or handle of said rod prevents the same sliding or dropping down through said clip. This clip also has an expansible clamp $e'$, with a clamping-screw $e''$ for securing the clip to the upper portion of the reach-bar, with the hoop or clip depending from the same.

It will thus be observed that the support can be folded into a very compact form and will in no way interfere with the use of the machine or in any way inconvenience the rider, and yet will be ready for instant use in supporting the machine.

The device is light and durable and can be made and sold at a low cost and applied easily and quickly to any machine of the ordinary form and construction.

It is evident that many changes and modifications can be made in the forms, constructions, and arrangements of the parts described without departing from the spirit and scope of my invention. Hence I do not wish to limit myself to the invention exactly as here shown and described.

Having thus fully described my invention, what I claim as new, and desire to secure by Letters Patent of the United States, is—

1. A bicycle, in combination with a horizontal plate secured to the lower portion of the bicycle-frame and having separate transverse holes therein inclined in two directions, supporting-rods sliding in said holes and having their upper ends pivoted loosely together above the plate so that the rods can spread to form the support when the rods are pushed down through the plate, and can draw together when the rods are drawn up at a decided angle to the plate, and a catch secured to the upper portion of the frame to hold the rods in their elevated position drawn together at an angle to the plate with their lower ends in said holes in the plate, substantially as described.

2. A bicycle-support comprising a head or plate having the three holes therein, one of said holes inclined in one direction and the other two holes inclined in approximately the same direction as the first-named hole, each of said last two mentioned holes inclined additionally in other directions to permit spreading of the supporting-rods, said plate provided with securing means, the three supporting-rods in said holes, the rod in the first-mentioned hole having its upper end provided with a handhold and the upper ends of the two rods in the remaining holes loosely joined to and on opposite sides of said first-mentioned rod, and a catch or holding means to hold the rods in elevated position when in use, substantially as described.

3. A bicycle, in combination with a clamp secured to a lower portion of the frame and carrying a horizontally-disposed plate having three separate vertical holes inclined in different directions, a clamp secured at an elevated portion of the frame and having a spring hook or catch, and the three supporting-rods sliding, respectively, in said holes, the upper ends of two of said rods pivoted directly and loosely to and on opposite sides of the third rod to permit lateral swing independent of said third rod so that the rods when forced down through the plate will be spread thereby to form a tripod and the pivotal point will be immediately above the plate and the two rods will lock against the third rod, the upper end of the third rod above the pivot having a head forming a handle and holding the rods in said hook when elevated, substantially as described.

In testimony whereof I affix my signature in presence of two witnesses.

JOHN E. NORELIUS.

Witnesses:
 HUBERT E. PECK,
 W. H. BARNES.